United States Patent
Morita

[11] Patent Number: 6,068,466
[45] Date of Patent: May 30, 2000

[54] TWIN TYPE CONTINUOUS KNEADING EXTRUDER

[75] Inventor: Keita Morita, Tokyo, Japan

[73] Assignee: Chuo Kagaku Co., Ltd., Saitama, Japan

[21] Appl. No.: 08/956,071

[22] Filed: Oct. 22, 1997

[30] Foreign Application Priority Data

Jun. 4, 1997 [JP] Japan ................... 9-146832

[51] Int. Cl.[7] .................... B29C 47/40
[52] U.S. Cl. .................. 425/203; 366/75; 366/85; 366/86; 425/204; 425/205
[58] Field of Search .................. 425/204, 205, 425/208, 209, 203; 366/83, 84, 85, 86, 91, 92, 75

[56] References Cited

U.S. PATENT DOCUMENTS

| | | | |
|---|---|---|---|
| 2,615,199 | 10/1952 | Fuller | 425/192 R |
| 3,070,836 | 1/1963 | De Haven et al. | 425/204 |
| 3,078,511 | 2/1963 | Street | 366/84 |
| 3,749,374 | 7/1973 | Buchheit | 259/192 |
| 4,025,058 | 5/1977 | Mizuguchi | 259/192 |
| 4,900,156 | 2/1990 | Bauer | 366/85 |
| 5,409,366 | 4/1995 | Vincent | 425/204 |

FOREIGN PATENT DOCUMENTS 7-88926  4/1995  Japan.

*Primary Examiner*—Harold Pyon
*Assistant Examiner*—Joseph Leyson
*Attorney, Agent, or Firm*—Greer, Burns & Crain, Ltd.

[57] ABSTRACT

A twin shaft continuous kneading extruder has a twin kneading feeder portion provided with two passages juxtaposed to each other within a casing. The passages are cocoon-shape in cross-section and hold two kneading shafts rotatably disposed in the respective passage portions. A single screw portion substantially extends one of the passages and holds a screw shaft that substantially extends one of the kneading feeder shafts. In addition, a plurality of mixing portions are provided on the twin kneading feeder portion. A first degassing open vent communicates with the kneading feeder shafts between mixing portions while a second vacuum degassing open vent is provided on the single screw portion. The first mixing portion keeps resin fed from a material feeding port in a semi-gelled condition. Thereafter, the resin is completely melted and kneaded in a second mixing portion after degassing. The resin is then fed to the single screw portion which subjects the resin to a vacuum degassing to be further extruded.

11 Claims, 2 Drawing Sheets

TWIN TYPE CONTINUOUS KNEADING EXTRUDER

BACKGROUND OF THE INVENTION

1. Field of the Invention

The present invention relates to a twin type continuous kneading extruder, and more particularly to a continuous type kneading extruder for continuously performing melting, kneading, degassing and extruding.

2. Description of the Related Art

A conventional twin type continuous kneading extruder for continuously performing melting, kneading, degassing and extruding is shown in Japanese Laid-open Patent Application No. Hei 7-88926. The twin type continuous kneading extruder shown in this publication was invented by the present inventors and the present invention is based on that invention.

The conventional twin type continuous kneading extruder disclosed in that publication includes a twin screw portion in which a first screw shaft and a second screw shaft are arranged rotatably in respective passage portions within a first casing provided with two passage portions continuous with each other and having a cocoon-shaped cross-section. The twin screw portion is provided with two mixing portions.

Each mixing portion is formed by changing a part of each screw shaft from a screw to a mixing rotor. Namely, each mixing portion is constituted by providing the mixing rotor instead of the screw at the same position in the longitudinal direction of each of the two screw shafts.

A single screw portion is provided at a final end portion of the first casing provided with two passage portions to form the twin screw portion. The single screw portion includes a second casing provided with a single passage portion within its interior and connected to the first casing. The passage portion of the second casing is in direct communication with one of the passage portions of the first casing. The single screw is arranged rotatably within the interior thereof and connected directly to the screw shaft disposed in one of the passage portions of the first casing.

The final end portion of the other passage portion of the first casing is in communication with the passage portion of the first casing through a flow rate regulating valve. Accordingly, the molten resin material is introduced into the passage portion of the second casing directly from one of the passage portions of the first casing of the twin screw portion and through the flow rate regulating valve from the other passage of the first casing, respectively.

A vent for degassing under vacuum level in communication with the passage portion of the second casing is provided in the single screw portion, and moisture is degassed from the resin material that is molten and kneaded by the vent. A discharge outlet for discharging the molten resin fed by the screw shafts through the passage portion is provided at the final end portion of the second casing of the single screw portion.

In comparison with the old type well known extruder, the thus constructed conventional twin type continuous kneading extruder is very advantageous in solving the disadvantage that the size of the apparatus is large and the energy consumption is large resulting in poor efficiency, and the defect that it is difficult to clean the complicated screws and cylinders by dismounting or exploding the parts of the screws and cylinders. However, the present inventors have found that, when the twin type continuous kneading extruder is used, the quality of the molten resin fed out from the discharge outlet of the single screw portion has a problem or the capacity of the extruder is disadvantageous. More specifically, although the vacuum degassing is performed in the single screw portion, as a matter of fact, when the molten resin discharged from the discharge outlet is inspected, there is a disadvantage that the vacuum degassing is not sufficiently carried out. Also, the conventional twin type continuous kneading extruder suffers from a problem that the gas generated in the process for melting the resin within the twin screw portion resides in the casing resulting in the poor biting of the material, as a result of which the discharge capacity is degraded.

SUMMARY OF THE INVENTION

The present inventor made vigorous efforts as to why such an insufficient degassed condition and the discharge capability drop would occur and found out that the kneading extrusion of the molten resin that had been sufficiently degassed could be obtained by improving the conventional twin type continuous kneading extruder. It is therefore an object of the present invention to provide a twin type continuous kneading extruder that may produce the sufficiently degassed molten resin at a high discharge capability while overcoming the defects inherent in the above-described conventional twin type continuous kneading extruder.

The present invention is related to a twin type continuous kneading extruder in order to solve the above-described technical tasks. Namely, the twin type continuous kneading extruder according to the present invention includes: a twin kneading feeder portion provided with two passage portions juxtaposed to each other within a casing and having a cocoon-shape in cross-section, in which a first kneading shaft and a second kneading shaft are rotatably disposed in the respective passage portions; a single screw portion which is composed by a substantial extension of one of the passage portions within the casing and a screw shaft which is a substantial extension of the first kneading feeder shaft disposed within its interior; a material feeding port provided at a feeding end portion of the casing for feeding material to the twin kneading feeder portion; a discharge port provided in the casing for discharging the kneaded material from an end portion on a final end portion of the single screw portion; a plurality of mixing portions provided in the twin kneading feeder portion by constituting parts of the first kneading feeder shaft and a second kneading feeder shaft by mixing rotors; a first degassing open vent provided in the casing for communicating with at least one of the plurality of mixing portions and the kneading feeder shafts between the mixing portions; and a second vacuum degassing open vent provided in communication with an interior of the casing at a predetermined position of the single screw portion, and is characterized in that the resin is fed from the material feeding port, and fed to the single screw portion while the resin is semi-gelled, molten, kneaded and degassed in the twin kneading feeder portion, and the molten resin is vacuum degassed and extruded in the single screw portion.

The twin type continuous kneading extruder according to the present invention is composed of the above-described structural elements but the structural elements may be specifically modified as follows. More specifically, in the case where the resin material cast from the feeding port is in the form of pellets in the twin type continuous kneading extruder, a gap between a maximum diameter portion of each of the mixing rotors in the mixing portions formed on the side of the feeding end portion of the twin feeder portion and inner walls of the passage portions of the casing is designed to be somewhat smaller than a maximum dimension of the resin pellets; and after the resin that has been fed from the material feeding port is kept under a semi-gelled condition in the mixing portions on the side of the feeding end portion of the twin kneading feeder portion, and at the same time, the resin kept under the semi-gelled condition is degassed through the first open vent, the resin is perfectly molten and kneaded in the mixing portions on the final end side.

Furthermore, according to the present invention, in the twin type continuous kneading extruder, in the case where the resin material cast from the feeding port is in the form of powder in the twin type continuous kneading extruder, a gap between a maximum diameter portion of each of the mixing rotors in the mixing portions formed on the feeding end portion of the twin feeder portion and inner walls of the passage portions of the casing is designed so that the resin may be kept under a semi-gelled condition in conformity with the size of the powder; and after the resin that has been fed from the material feeding port is kept under a semi-gelled condition in the mixing portions on the feeding end portion of the twin kneading feeder portion, and at the same time, the resin kept under the semi-gelled condition is degassed through the first open vent, the resin is perfectly molten and kneaded in the mixing portions on the final end side.

In the twin type continuous kneading extruder, it is preferable that the gap between the mixing rotors of the plurality of mixing portions and the inner walls of the passages of the casing is designed to be smaller toward the final side end of the twin kneading feeder portion in the case where the viscosity is lowered in the process of melting the resin; and the gap is designed to be larger toward the final end side of the twin kneading feeder portion in the case where the viscosity is increased in the process of melting the resin.

In the twin type continuous kneading extruder of the present invention thus constructed, the resin material that has been fed from the material feeding port is kept under the semi-gelled condition by soft kneading by the twin kneading feeder portion, more particularly by the first mixing portions. The resin that has been kept under the semi-gelled condition in the first mixing portions is degassed by the first open vent provided downstream of the mixing portions and the moisture contained in the resin is degassed.

Thereafter, the semi-gelled resin is molten and kneaded perfectly in the second mixing portions and fed to the single screw portion from the twin kneading feeder portions. Then, the molten resin is further fed to the discharge side by the single screw portion. Meanwhile therefor; the vacuum degassing process for the molten resin is performed in the second open vent and the resin is finally extruded from the discharge port.

DESCRIPTION OF THE PREFERRED EMBODIMENTS

Figure 1:
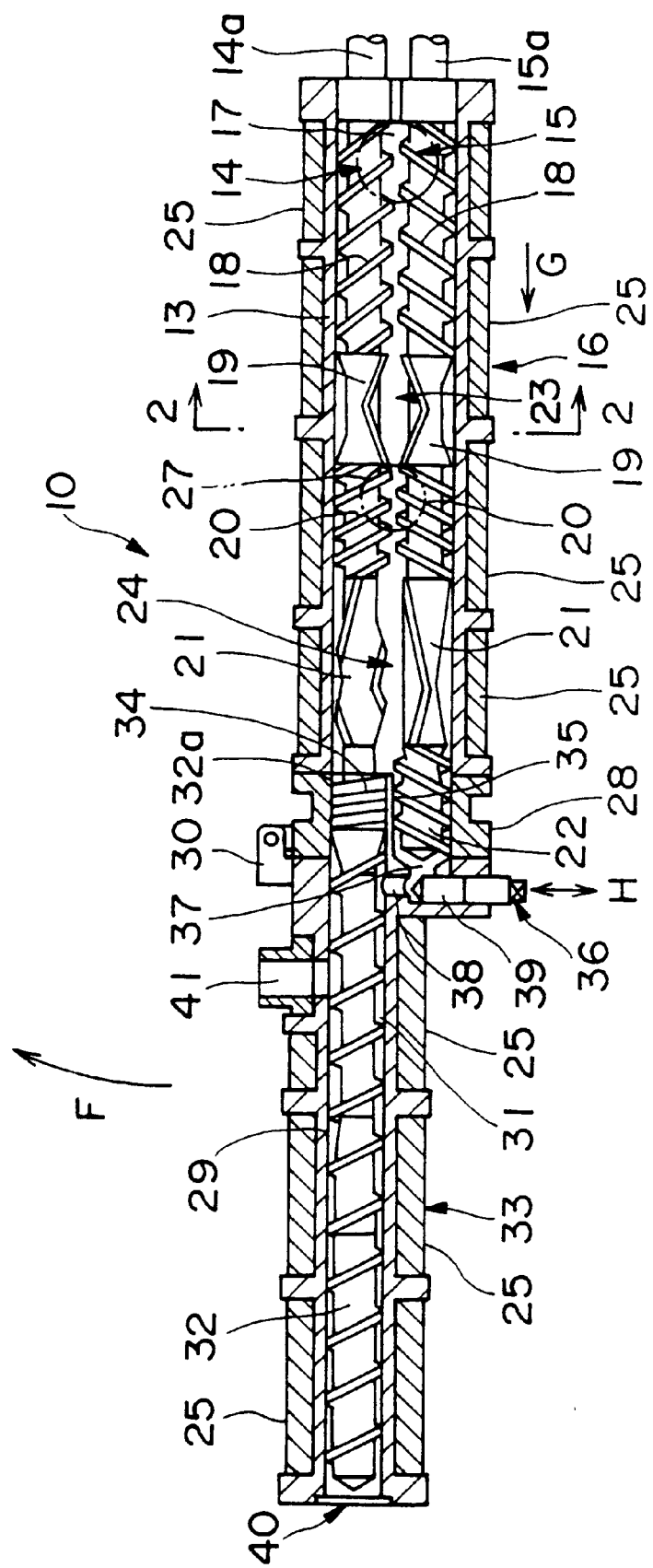
FIG. 1 is a cross-sectional view showing a twin type continuous kneading extruder according to one embodiment of the present invention.
Figure 2:
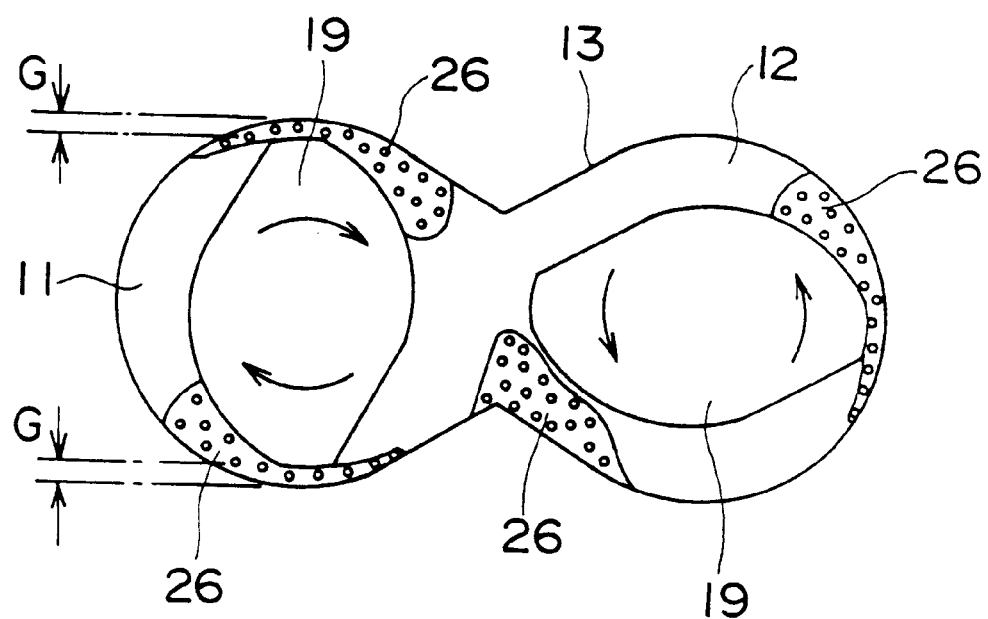
FIG. 2 is a cross-sectional view schematically showing a first mixing portions of the twin type continuous kneading extruder shown in FIG. 1 and taken along the line 2—2 of FIG. 1.

A twin type continuous kneading extruder in accordance with one embodiment of the invention will now be described with reference to the accompanying drawings. FIG. 1 shows the twin type continuous kneading extruder 10. The twin type continuous kneading extruder 10 according to the embodiment includes a twin kneading feeder portion 16 in which a first kneading feeder shaft 14 and a second kneading feeder shaft 15 are disposed rotatably in two passage portions 11 and 12, respectively, which are provided in a casing 13 and are continuously juxtaposed to each other and have a cocoon-shaped cross-section as best shown in FIG. 2.

A material feeding port 17 in communication with the respective passage portions 11 and 12 is formed at one end of the first casing 13 of the twin kneading feeder portion 16. Resin material is fed from the resin feeding device (not shown) to the material feeding port 17. Each of the kneading feeder shafts 14 and 15 is composed, in order from one end of the first casing 13 in the longitudinal direction, of a first screw 18, a first mixing rotor 19, a second screw 20 and a second mixing rotor 21. However, only the second kneading feeder shaft 15 is provided with a third screw 22 having a length such that it projects outwardly from the first casing 13. The third screw 22 will be explained in more detail later.

Such kneading feeder shafts 14 and 15 may be constituted by selectively arranging segmentized screws and mixing rotors, having various lengths, for base shafts 14a and 15a. Accordingly, by combining the different length screws and the different number of different length mixing rotors as desired, it is possible to adjust a kneading period of time.

Incidentally, the first screw 18, the first mixing rotor 19, the second screw 20 and the second mixing rotor 21 of the first kneading feeder shaft 14 are the same in length and shape as those of the second kneading feeder shaft 15. Accordingly, the first mixing portion 23 of the twin kneading feeder portion 16 is constituted by the cooperation between the two adjacent first mixing rotors 19 of the two kneading feeder shafts 14 and 15 as shown in FIG. 2.

In the same manner, the second mixing portion 24 of the twin kneading feeder portion 16 is constituted by the cooperation between the two adjacent second mixing rotors 21 of the two kneading feeder shafts 14 and 15. In the twin kneading feeder portion 16, the first mixing portion 23 which the material fed by the two kneading feeder shafts 14 and 15 from the material feeding port 17 first reaches is formed so that the material becomes a semi-gelled condition.

In other words, in the case where the resin material fed from the material feeder port 17 to the respective passage portions 11 and 12 of the first casing 13 is in the form of pellets (in general, cylindrical members are about 3 mm long and about 3 mm in diameter), as shown in FIG. 2, a gap G between a maximum outer diameter portion of the first mixing rotor 19 and the inner walls of the passage portions 11 and 12 of the first casing 13 is designed so as to be somewhat smaller than the maximum dimension of resin pellets. For example, the preferable dimension of the gap G is in the range of 1 to 4 mm.

For this reason, the resin material 26 that has been preheated by a heating means 25 mounted around the first casing 13 during the period from the material feeding port 17 to the first mixing portion 23 is kept under the semi-gelled condition in the first mixing portion 23. When the resin material 26 is thus kept in the semi-gelled condition, the moisture adhered to the resin material is evaporated. In order not to knead the evaporated moisture into the semi-gelled resin material 26, the degassing process is effected in the first mixing portion 23.

In order to perform the degassing, a first open vent 27 in communication with the second screw portion 20 is provided in the first casing 13. Thus, the moisture evaporated from the semi-gelled resin 26 is discharged outside of the first casing 13 through the first open vent 27. As a result, it is possible to prevent the evaporated moisture in the first mixing portion 23 from being again entrained and kneaded into the molten resin 26 kept under the semi-gelled condition.

With respect to the degassing process, in the case where a filler (for example, talc or calcium carbonate) is added to the resin and the resin is kneaded and extruded, since the filler has characteristics of high moisture absorption property, if the kneading extruding is performed in the apparatus where the resin material is degassed under the semi-gelled condition, the quality of the molten resin which is a final product is very high and its discharge capacity is enhanced. However, in the conventional apparatus where the degassing is not performed, the moisture is kneaded into the molten resin so that it is difficult to perform the vacuum degassing process in the later process and the discharge capacity is degraded.

Also, in the case where the resin material is PET (polyethylenetelephtalate), if the kneading extruding process is performed in the conventional apparatus, there is a problem that the moisture is kneaded into the molten resin and hydrolysis occurs. However, if the molten metal is degassed in the semi-gelled condition, such phenomena are avoided completely.

The resin 26 kept in the semi-gelled condition and degassed in the first mixing portion 23 and thereafter fed by the second screw 20 is completely molten and kneaded in the second mixing portion 24. Accordingly, in the case where the viscosity of the resin is lowered in the process of melting the resin, the gap G between the maximum diameter portion of the mixing rotor 21 and the inner walls of the passage portions 11 and 12 of the first casing 13 is designed so as to be small in the range of, for example, 0.1 to 1.0 mm.

In the case where the resin material fed to each of the passages 11, 12 of the first casing 13 from the material feeding port 17 is in the form of powder, the gap G between the maximum diameter portion of the mixing rotor 19 and the inner walls of the passage portions 11 and 12 of the first casing 13 is designed to be small enough to be in the semi-gelled condition. In general, the gap G is preferably in the range of about 0.1 to 1.0 mm.

However, in the twin type continuous kneading extruder 10, in the case where the viscosity of the resin is lowered in the process of melting the resin, it is preferable that the gap G between the mixing rotors 19 and 21 of the plurality of mixing portions 23 and 24 and the inner walls of the passage portions 11 and 12 of the first casing 13 is designed to be smaller toward the final end of the twin kneading feeder 16, and in the case where the viscosity of the resin is increased in the process of melting the resin, it is preferable that the gap G is larger toward the final end.

One end of the second casing 29 is connected through a joint portion 28 to the other end of the first casing 13 to be rotatable in a direction of arrow F relative to the joint portion 28 by a hinge device 30. The reason why the second casing 29 is connected rotatably to the joint portion 28 is that the maintenance work such as cleaning or exchanging parts for the passages and the kneading feeder shafts in the interior of the first casing 13 and the second casing 29 is performed easily.

In the same way as in the first kneading feeder 16, a heating means 25 is mounted around the outer peripheral portion of the second casing 29. Also, a passage portion 31 whose centerline is identical with the extension of the centerline of the passage portion 11 of the first casing 13 is formed in the interior of the second casing 29. A single screw shaft 32 for feeding the molten resin is rotatably disposed within the passage portion 31 to thereby constitute a single screw portion 33. One end portion of the screw shaft 32 is connected to a first kneading feeder shaft 14 through the passage portion within the joint portion 28.

Of course, it is possible to constitute the screw shaft 32 by mounting the segmentized screw on the basis of the main shaft as described above. In this case, it is possible to use the extension of the base shaft 14a of the first kneading feeder 14 as the main shaft. One end portion of the screw shaft 32, i.e., the end portion located within the joint portion is a flow rate regulating portion 34 around which a screw groove 32a having a fine pitch and which is shallower than the other parts is formed. The flow rate regulating portion 34 limits, at minimum, the flow rate of the resin that flows therethrough.

By the way, the joint portion 28 is provided in its interior with a single penetrating passage which is divided into two passages by a bearing portion 35. When the joint portion 28 is fixed to the other end portion of the first casing 13, the two passages are in perfect alignment with the respective passages 11 and 12. One end portion of the screw shaft 32 which serves as the above-described flow rate regulating portion 34 is located at one of the passages. The third screw 22 projecting from the passage 12 of the first casing 13 is located at the other passage.

A flow rate regulating mechanism 36 is provided at one end of the second casing 29. The passage 12 of the first casing 13 is in communication with the passage 31 of the second casing 29 through the flow rate regulating mechanism 36. Namely, the flow rate regulating mechanism 36 is composed of a chamber 37 in communication with the passage of the joint portion 28 where the third screw 22 of the second kneading feeder shaft 15 is arranged, and a small diameter passage 38 in communication with the passage portion of the second casing 29.

A cylindrical valve body 39 is mounted so as to be inserted into the chamber 37 from the outside through a hole formed in the second casing 29. The valve body 39 is movable in a direction indicated by an arrow H. Then, the valve body 39 opens and closes the small diameter passage 38 by its movement to thereby adjust the flow rate of the molten resin flowing through the passage 38.

On the other hand, the passage 31 formed in the interior of the second casing 29 is opened to the outside at the other end of the second casing 29 so that the open portion becomes the discharge port 40 for the molten resin. Furthermore, a second open vent 41 for vacuum degassing is provided at the side of one end of the second casing 29 in the single screw portion 33. The open vent 41 is in communication with the passage 31 of the second casing 29.

Thus, the flow rate regulating mechanism 36 is used to communicate the twin kneading feeder 16 and the single screw portion 33 with each other and to bypass the molten resin reaching the single screw portion 33 to thereby adjust the flow rate. Accordingly, almost all of the molten resin retained by the above-described flow rate regulating portion 34 is collected, and the molten resin material is fed under pressure to the second casing 29 through the flow rate regulating mechanism 36.

Incidentally, it is possible to use another structure as the flow rate regulating mechanism. For example, it is possible to use a structure in which the first kneading feeder shaft 14 is movable in the axial direction, the valve body is formed by the kneading feeder shaft 14 and a corrugation portion formed on the inner surface of the first casing 13 around the kneading feeder shaft 14, and the opening degree of the flow passage is adjusted.

The operation of the continuous kneading extruder 10 will now be described. The resin material cast from the material feeding port 17 is heated by the heating means 25 while being fed in the direction indicated by the arrow G by the first screws 18 of the first kneading feeder shaft 14 and the second kneading feeder shaft 15. The resin is kneaded in the semi-gelled condition by the first mixing portion 23 as described above. At the same time, the evaporated moisture is degassed from the open vent 27.

Subsequently, the molten resin kept under the semi-gelled condition is fed by the second screws 20. It is preferable that, at this time, the RPM of the first kneading feeder shaft 14 and the second kneading feeder shaft 15 be variable in accordance with a kind of resin. The semi-gelled resin material that has been thus fed by the second screws 20 is perfectly molten and kneaded in the second mixing portions 24. The resin which has been molten and kneaded is fed to the chamber 37 by the third screw 22 and is fed into the interior of the passage portions 31 of the second casing 29 through the passage 38 while the flow rate is regulated by the valve body 39.

Thus, the flow rate is adjusted so that the residual time of the kneaded molten resin material and the filling rate of the resin may be adjusted by the twin kneading feeder 16. Accordingly, the kneading degree may be adjusted as desired, by operating the flow rate regulating mechanism 36. The opening degree of the passage 38 is controlled in response to the condition of the molten resin material so that it is possible to normally impart the constant kneading degree to the molten resin material.

Also, the resin material kept under the semi-gelled condition in the first mixing portion 23 is degassed in this portion. Accordingly, the moisture adhered to or contained in the resin material is discharged to the outside of the first casing 13 through the first open vent 27. As a result, the molten resin material fed to the second casing 29 has almost no moisture. As a result, it is possible to enhance the quality of the molten resin material. Also, the resin is degassed in the semi-gelled condition and thereafter perfectly molten and kneaded. Accordingly, the gas does not reside in the second casing and the biting of the material is enhanced to improve the discharge capability.

Thus, the resin material that has been molten and kneaded for the adjustment is fed to the single screw portion 33 and vacuum degassed from the second open vent 41. Thereafter, the resin is fed in order by the screw shaft 32 and extruded from the discharge outlet 40. Incidentally, it is necessary to explode and clean the inner parts in the case where a kind and a color of resin are changed to other ones. In this case, the screw shaft 32 and the first kneading feeder shaft 14 as a whole are pulled out from the discharge outlet 40.

Then, after the second casing 29 of the single screw portion 33 is opened by rotating it in the F direction about a pivot of the hinge means 30, the second kneading feeder shafts 15 are removed. It is possible to perform the cleaning work for a short period of time by such a simple work, by opening the apparatus. Incidentally, since the first kneading feeder shaft 14 and the second kneading feeder shaft 15 are supported by the lubrication effect of the bearing of the molten resin, it is unnecessary to provide a mechanical bearing or the like and the internal cleaning is also facilitated.

In the above-described twin continuous kneading extruder 10 in accordance with the embodiment, the two kneading feeder shafts 14 and 15 are connected detachably to a gear box and a rotary drive device (both of which are not shown) disposed outside of the first casing 13. Also, the heating means 25 mounted around the respective casings 13 and 29 take a ring-shape so as to surround the respective casings and may be conventional devices that generate heats from a power source (not shown).

As described above, in the twin type continuous kneading extruder according to the present invention, the resin material that has been fed to each of the passage portions of the casings from the material feeding port is preheated by the heating means and kept under the semi-gelled condition in the mixing portions. At the same time, corresponding to this operation, the moisture that has been adhered to the resin material is degassed. Thereafter, since the resin has been perfectly molten and kneaded in the mixing portions, there is no fear that the moisture would be kneaded into the molten resin material. As a result, it is possible to perform the vacuum degassing process, and it is possible to finally obtain a high quality kneaded resin at a high discharge output rate.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A twin shaft continuous kneading extruder comprising:
   a twin kneading feeder portion provided with two passage portions juxtaposed to each other within a casing and having a cocoon-shape in cross-section, in which a first kneading shaft and a second kneading shaft are rotatably disposed in the respective passage portions, said casing having innerwalls that define said two passage portions, said twin kneading feeder portion having a final end portion and a feeding end portion at ends of said passage portions;
   single screw portion substantially extending one of said passage portions within the casing, and having a screw disposed within said single screw portion and substantially extending said first kneading shaft;
   a material feeding port provided at said feeding end portion of the casing for feeding resin material to said twin kneading feeder portion;
   a discharge port provided in the casing for discharging kneaded resin material from an end portion of said single screw portion;
   a plurality of mixing portions provided in said twin kneading feeder portion and including mixing rotors on said first kneading shaft and said second kneading shaft, and a gap defined between said mixing rotors and said innerwalls of said casing, said gap having a varying first width either smaller toward said final end portion of said twin kneading feeder portion than the first width at said feeding end portion of said twin kneading feeder portion when the viscosity of said resin material is lowered in the process of melting said resin material or said first width of the gap is larger toward said final end portion of said twin kneading feeder portion than the first width at said feeding end portion when the viscosity of said resin material is increased in the process of melting the resin material;
   a first degassing open vent provided in the casing for communicating with at least one mixing portion of the plurality of mixing portions and said kneading shafts within said one mixing portion; and a second vacuum degassing open vent provided in communication with an interior of the casing at a predetermined position of said single screw portion;

wherein said twin kneading feeder portion semi-gels, melts, kneads and degasses said resin material fed from said material feeding port, and said single screw portion vacuum degasses and extrudes said resin material.

2. The twin shaft continuous kneading extruder according to claim 1, wherein said gap further includes a second width between a maximum diameter portion of each of said mixing rotors in said mixing portion formed on the feeding end portion of said twin kneading feeder portion and said inner walls of said passage portions of the casing, said second width being smaller than a maximum dimension of pellets in said resin material that is cast from said feeding port;

whereby said mixing portion on the side of said feeding end portion of the twin kneading feeder portion and said first degassing open vent simultaneously maintain said resin material in a semi-gelled condition while degassing said resin material, and whereby said mixing portion on the final end portion of the twin kneading feeder portion further kneads and melts the resin material.

3. The twin shaft continuous kneading extruder according to claim 1, wherein said gap further includes a second width between a maximum diameter portion of each of said mixing rotors in said mixing portion formed on the feeding end portion of said twin kneading feeder portion and said inner walls of said casing, said second width being predetermined depending on the size of powder in said resin material that is cast from said feeding port so that said gap is sufficient to keep the resin material in a semi-gelled condition, whereby said mixing portion on the side of the feeding end portion of the kneading feeder portion and said first degassing open vent simultaneously maintain said resin material in a semi-gelled condition while degassing said resin material, said mixing portion on the final end portion of the twin kneading feeder portion further kneads and melts the resin material.

4. The twin shaft continuous kneading extruder according to claim 1, wherein said single screw portion is substantially detachable from said twin kneading feeder portion and said screw shaft is detachable from said first kneading feeder shaft.

5. The twin shaft continuous kneading extruder according to claim 4, wherein said single screw portion is attached to said twin kneading feeder portion by a hinge.

6. The twin shaft continuous kneading extruder according to claim 1, further comprising a flow rate regulating mechanism that controls the flow of the material from said twin kneading feeder portion to said single screw portion.

7. The twin shaft continuous kneading extruder according to claim 6, wherein said single screw portion includes a chamber opened to at least one of said passage portions in said twin kneading feeder portion and a connecting passage communicating said chamber with said passage portion in said single screw portion, and said flow rate regulating mechanism further includes a valve body configured and disposed within said chamber so that said valve body selectively slides to open, close and vary the size of an opening of said connecting passage.

8. A twin shaft continuous kneading extruder comprising:

a twin kneading feeder portion provided with a casing with innerwalls that define two passage portions juxtaposed to each other and having a first kneading shaft and a second kneading shaft rotatably disposed in the respective passage portions, said twin kneading feeder portion having a feeder end portion and a final end portion, a single screw portion substantially detachably connected to an end of said twin kneading feeder portion so that said single screw portion substantially extends one of said passage portions within the casing, and having a screw shaft substantially extending said first kneading shaft;

a flow rate regulating mechanism that controls the flow of resin material from said twin kneading feeder portion to said single screw portion, a plurality of mixing portions provided in said twin kneading feeder portion and including mixing rotors on said first kneading feeder shaft and said second kneading feeder shaft; and a gap defined between said mixing rotors and said innerwalls of said casing, said gap having a varying first width either smaller toward said final end portion of said twin kneading feeder portion than the first width toward said feeding end portion of said twin kneading feeder portion when the viscosity of said resin material is lowered in the process of melting said resin material or said first width of the gap is larger toward said final end portion of said twin kneading feeder portion than the first width toward said feeding end portion when the viscosity of said resin material is increased in the process of melting the resin material.

9. The twin shaft continuous kneading extruder according to claim 8, further comprising:

a material feeding portion provided at said feeding end portion of the casing for feeding material to said twin kneading feeder portion; and a discharge port provided in the casing for discharging kneaded resin material from an end portion of said single screw portion.

10. The twin shaft continuous kneading extruder according to claim 8, wherein said single screw portion is attached to said twin kneading feeder portion by a hinge.

11. The twin shaft continuous kneading extruder according to claim 8, wherein said single screw portion further includes a chamber opened to at least one said passage portion in said twin kneading feeder portion and a connecting passage communicating said chamber with said passage portion in said single screw portion, and said flow rate regulating mechanism further includes a valve body configured and disposed within said chamber so that said valve body selectively slides to close, open and vary the size of an opening of said connecting passage.

* * * * *